United States Patent [19]

Ziegler

[11] Patent Number: 5,065,667
[45] Date of Patent: Nov. 19, 1991

[54] HEATING OR AIR CONDITIONING CONTROL DEVICE FOR A MOTOR VEHICLE

[75] Inventor: Elmar Ziegler, Ahorn, Fed. Rep. of Germany

[73] Assignee: Siemens Aktiengesellschaft, Berlin and Munich, Fed. Rep. of Germany

[21] Appl. No.: 520,263

[22] Filed: May 8, 1990

[30] Foreign Application Priority Data

May 16, 1989 [EP] European Pat. Off. ........ 89108771.0

[51] Int. Cl.⁵ .................... B60H 1/00; F16H 35/18; F16D 3/10
[52] U.S. Cl. ......................................... 98/2; 74/10 A; 464/51
[58] Field of Search ............. 98/2, 2.11, 2.05; 74/10 A; 464/51, 52, 53

[56] References Cited

U.S. PATENT DOCUMENTS

| | | | |
|---|---|---|---|
| 5,977 | 7/1874 | Welham | 464/52 |
| 1,759,001 | 5/1930 | Cherry et al. | 98/2.05 |
| 3,000,263 | 9/1961 | Milton et al. | 464/53 |
| 3,602,127 | 8/1971 | Walker et al. | 98/110 |
| 4,291,212 | 9/1981 | Bui | 74/10 A |
| 4,325,174 | 4/1982 | Smith et al. | 29/434 |
| 4,656,877 | 4/1987 | Hildebrand et al. | 74/68 |

FOREIGN PATENT DOCUMENTS 0178455 4/1986 European Pat. Off. .
7138451 2/1972 Fed. Rep. of Germany .

Primary Examiner—Albert J. Makay
Assistant Examiner—William C. Doerrler
Attorney, Agent, or Firm—Kenyon & Kenyon

[57] ABSTRACT

The adjusting movement of a control knob on a control device in the passenger compartment of an automobile is transferred to an air vent in an air shaft which leads to the passenger compartment in a simple manner requiring little space and few parts. A flexible steel shaft is coupled to the torque shaft of the control knob at an oblique angle to this torque shaft by way of a universal joint connection. To simplify construction, a first retainer for the universal joint is designed in one piece with the control knob torque shaft, and a second retainer is designed in one piece with an intermediate shaft to which the flexible steel shaft connected.

12 Claims, 2 Drawing Sheets

HEATING OR AIR CONDITIONING CONTROL DEVICE FOR A MOTOR VEHICLE

BACKGROUND OF THE INVENTION

The present invention relates to a heating or air conditioning control device for a motor vehicle. The control device utilizes a flexible steel shaft for transferring the rotational motion of a control knob into a setting motion at an air vent.

The translation of the rotary motion of a control knob into a setting motion at the air vents of an automobile has been accomplished in several ways in the prior art. Electro-mechanical means have been used to achieve such motion, but this requires the use of control circuitry, wires, motors, and a power supply. Alternatively, purely mechanical coupling has been used by means of Bowden cables, but this requires structurally complex and space-occupying crank or toothed wheel gears on the control knob near a control device. Such structures have been used to translate the rotary setting movement of the control knob into a setting movement at the air vents.

There remains a need for a device that uses few parts and is inexpensive to construct that couples the rotary setting movement of a control knob to a setting motion at the air vents of an automobile.

SUMMARY OF THE INVENTION

In accordance with the present invention, the transfer of the adjusting movement from at least one control device knob to at least one air vent or air vent control system in a heating/air conditioning control device is achieved in a simple manner requiring little space and few parts. Motion is transferred from the control knob to an air vent via a flexible steel shaft coupled through a universal joint connection to the torque shaft of the control knob. The flexible steel shaft is set at an oblique descending angle (which can be as shallow as 0 degrees) relative to the torque shaft. Further economies of construction may be achieved by simplifying the production and assembly of the device. To this end, the retainer for the universal joint of the universal joint connection is advantageously designed in one piece integrally with the torque shaft of the control knob. A second retainer for the universal joint of the universal joint connection is designed in one piece integrally with an intermediate shaft to which the flexible steel shaft is connected.

It is thus possible to directly translate the rotary movement of the control knob on the control device into a setting movement at a vent via a flexible steel shaft. Each of the universal joint retainers can be cast or molded as one piece in a simple manner integral with the torque shaft of the control knob or the retainer for the steel shaft, respectively. This obviates the need for additional, separate assembly steps, and results in low-cost, automated production.

DETAILED DESCRIPTION

Figure 1:
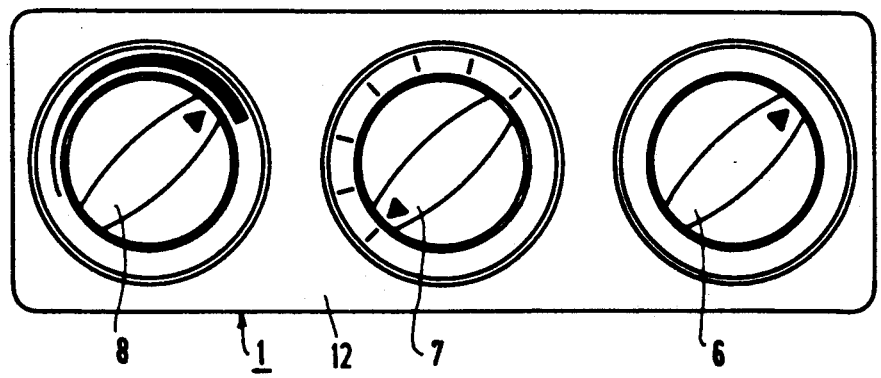
FIG. 1 is a frontal plan view of a control device.

FIG. 1 shows the frontal plan view of the front control device cover 12 of a central control unit 1, which is installed in the interior of a motor vehicle. Such a panel will typically comprise a blower control knob 8 to control the amount of air flow, by which the rotational speed of a central fan at the input of the heating and air conditioning control device is adjusted; a temperature control knob 7, through which cold air or warm air portions are accordingly mixed in a mixing chamber by way of an air-mixing vent; and an air distribution control knob 6, through which air ducts, e.g. of the defroster, mid-level, or legroom type, are supplied with varying amount of air by adjustments to the air vents.

Figure 2:
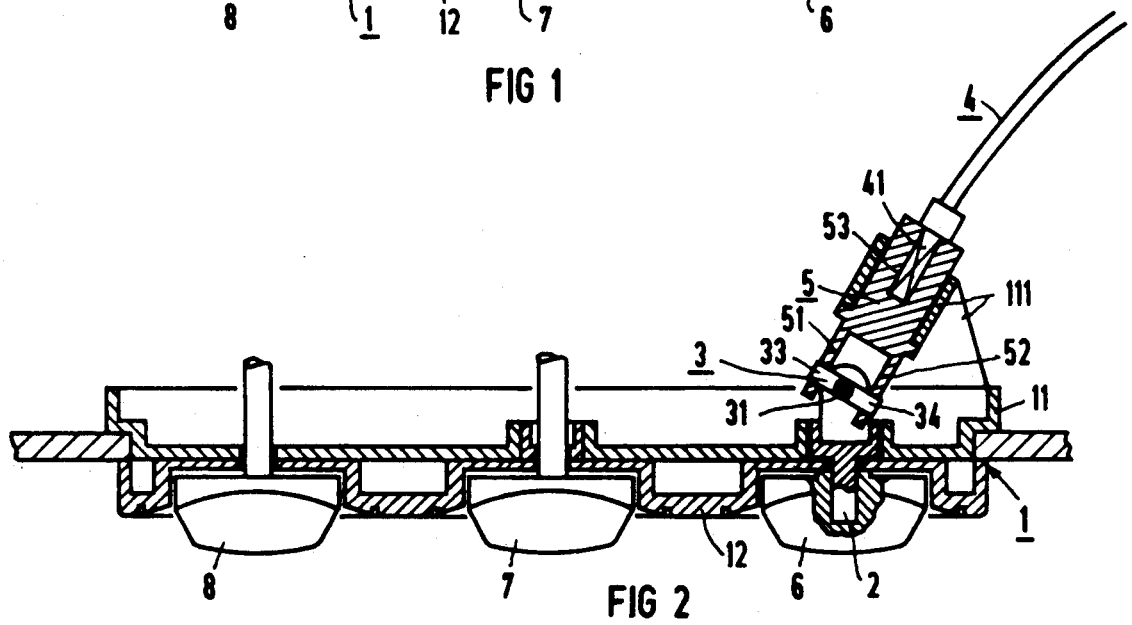
FIG. 2 shows the control device according to FIG. 1 in a longitudinal section with a flexible steel shaft coupled to a control knob by way of a universal joint connection.
Figure 3:
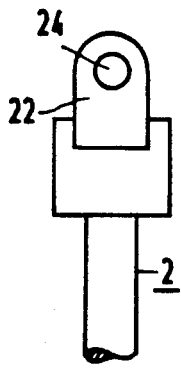
FIG. 3 is a side view of the torque shaft for a control knob with an integral universal joint retainer in a partial view.
Figure 4:
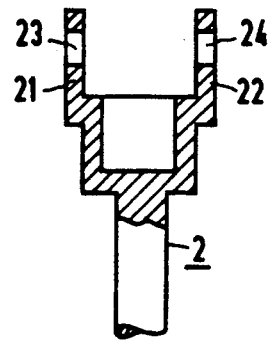
FIG. 4 shows the torque shaft according to FIG. 3 in a partial sectional view.
Figure 5:
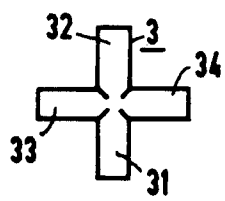
FIG. 5 is a plan view of an individual universal joint.
Figure 6:
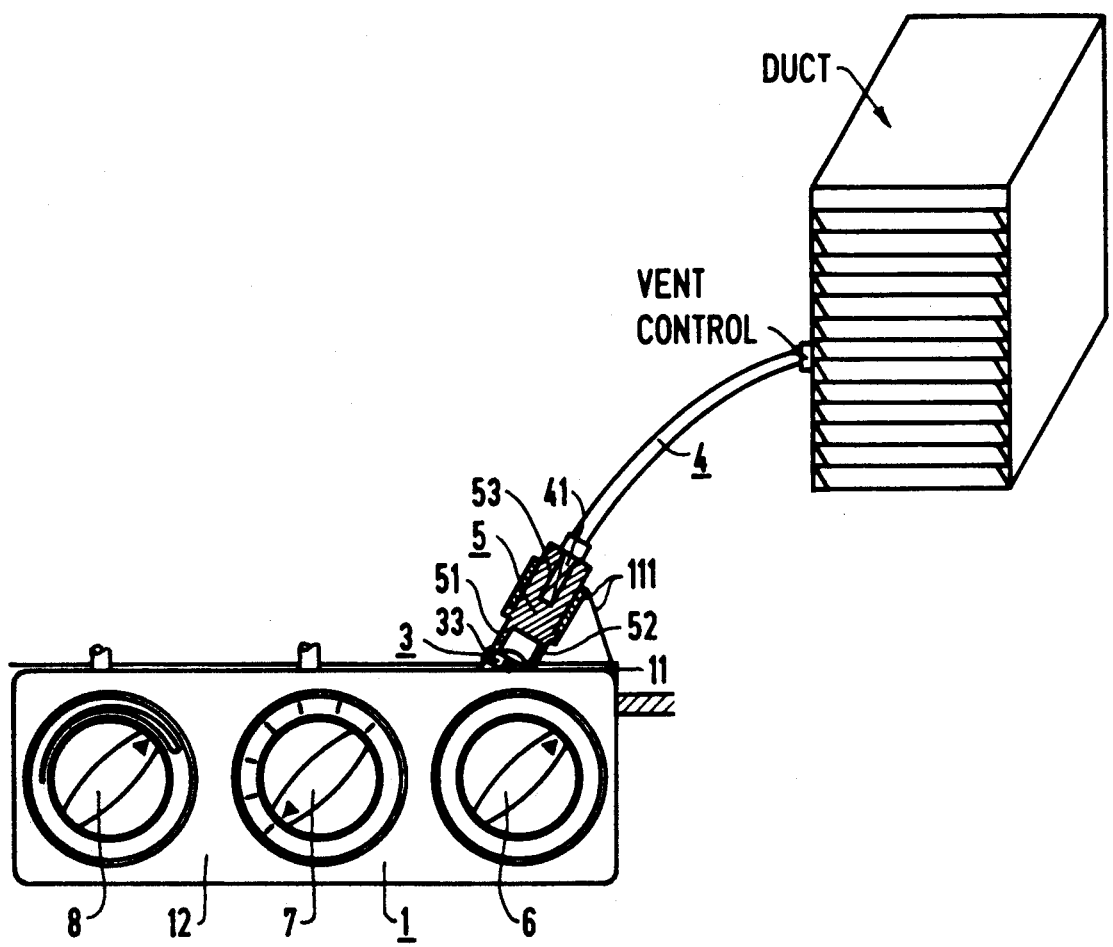
FIG. 6 is a schematic view of the connection between the control device and the automobile air vents.

In a partial sectional view of the control device 1, FIG. 2 shows the adjustment motion translating structure according to the invention. Such motion is transferred from the control knob 6 via a flexible steel shaft 4 to an air vent crank duct (illustrated schematically in FIG. 6) with a crank which is rotatably adjustable around an axis of rotation according to the rotation of the control knob 6. The control knob 6 is mounted axially in front onto a torque shaft 2 which is housed within a base frame 11 of the control device 1. The torque shaft 2, shown in FIGS. 3 and 4, is integral at its opposite end with a universal joint retainer consisting of two yokes 21 and 22 with bearing openings 23 and 24 for retaining the joint arms 31 and 32 of the universal joint 3 shown in FIG. 5. Yokes 51 and 52 for retaining both of the second joint arms 33 and 34 which are respectively mounted perpendicular to the first joint arms 31 and 32 are attached to one end of an intermediate shaft 5. The intermediate shaft 5 has at its other end an insertion opening 53 for the insertion end 4 of the flexible steel shaft 4, which has the shape of a square. This intermediate shaft 5 is insertably and pivotably mountable in an intermediate shaft duct 111. Shaft duct 111 is injection-molded in one piece onto the control device 1. The descending angle between the axis lo of the torque shaft 2 and the direction of the insertion end 41 of the flexible steel shaft 4 advantageously lies in a range between 0° to 45°.

What is claimed is:

1. A climate control device for a motor vehicle, comprising:

air ducts leading to the interior of a motor vehicle;

adjustable air vents associated with at least one of said air ducts;

a control panel;

at least one control knob supported in said control panel, said control knob providing various control settings, and said control knob having a torque shaft that is axially fixed in space so that it can not swivel with respect to the control panel;

a flexible steel shaft set at an oblique descending angle relative to said torque shaft;

a universal joint connection coupling the flexible steel shaft and the torque shaft; and wherein the movement of the control knob results in a corresponding movement of the flexible steel shaft, which in turn provides a setting movement at the air vents.

2. The device according to claim 1, wherein the descending angle formed by the torque shaft and the flexible steel shaft lies in the range of 0° to 45°.

3. The device according to claim 1, and further comprising an intermediate shaft coupling the flexible steel shaft to the universal joint and structure constraining the intermediate shaft within the control device.

4. The device according to claim 2, and further comprising an intermediate shaft coupling the flexible steel shaft to the universal joint and structure constraining the intermediate shaft within the control device.

5. The device according to claim 1, and further comprising a first retainer for the universal joint, the retainer for the universal joint and wherein the torque shaft and said first retainer are constructed as a one-piece injection-molded part.

6. The device according to claim 2, and further comprising a first retainer for the universal joint, the torque shaft of the control knob extending to said first retainer for the universal joint, and wherein the torque shaft and said first retainer are constructed as a one-piece injection-molded part.

7. The device according to claim 3, and further comprising a first retainer for the universal joint, the torque shaft of the control knob extending to said first retainer for the universal joint, and wherein the torque shaft and said first retainer are constructed as a one-piece injection-molded part.

8. The device according to claim 4, and further comprising a first retainer for the universal joint, the torque shaft of the control knob extending to said first retainer for the universal joint, and wherein the torque shaft and said first retainer are constructed as a one-piece injection-molded part.

9. The device of claim 7, and further comprising a second retainer for the universal joint, and wherein the intermediate shaft is contiguous with said second retainer for the universal joint, and the intermediate shaft and the second retainer are constructed as a one-piece injection-molded part.

10. The device of claim 8, comprising a second retainer for the universal joint, and wherein the intermediate shaft is contiguous with said second retainer for the universal joint, and the intermediate shaft and the second retainer are constructed as a one-piece injection-molded part.

11. The device of claim 3, and further comprising a retainer for the universal joint, and wherein the intermediate shaft is contiguous with said retainer for the universal joint, and the intermediate shaft and the retainer are constructed as a one-piece injection-molded part.

12. The device of claim 4, comprising a retainer for the universal joint, and wherein the intermediate shaft is contiguous with said retainer for the universal joint, and the intermediate shaft and the retainer are constructed as a one-piece injection-molded part.

* * * * *